United States Patent [19]

Hakozaki

[11] 3,778,776

[45] Dec. 11, 1973

[54] ELECTRONIC COMPUTER COMPRISING A PLURALITY OF GENERAL PURPOSE REGISTERS AND HAVING A DYNAMIC RELOCATION CAPABILITY

[75] Inventor: Katsuya Hakozaki, Tokyo, Japan

[73] Assignee: Nippon Electric Company, Ltd., Minato-ku, Tokyo, Japan

[22] Filed: June 10, 1971

[21] Appl. No.: 151,746

[30] Foreign Application Priority Data

June 11, 1970 Japan .............................. 45/50879

[52] U.S. Cl. .............................................. 340/172.5
[51] Int. Cl. .............................................. G06f 3/00
[58] Field of Search .................................. 340/172.5

[56] References Cited

UNITED STATES PATENTS

| | | | |
|---|---|---|---|
| 3,412,382 | 11/1968 | Couleur et al. | 340/172.5 |
| 3,461,433 | 8/1969 | Emerson | 340/172.5 |
| 3,328,765 | 6/1967 | Amdahl | 340/172.5 |
| 3,358,544 | 12/1967 | Macon et al. | 340/172.5 |
| 3,319,226 | 5/1967 | Mott et al. | 340/172.5 |

*Primary Examiner*—Harvey E. Springborn
*Attorney*—Sandoe, Hopgood & Calimafde

[57] ABSTRACT

A computer memory is divided into segments with reference to the programs being executed. Each pointer to a physical storage address consists of a segment number and a displacement. A program segment base table is provided in the memory for giving the physical base address for each segment. A tag field of at least one bit is provided in each of the general purpose registers and the addresses in the memory, which carries a tag for indicating whether the data word contains address data or the other data. Back-up registers are provided in one-to-one correspondence to the general purpose registers capable of being loaded with the data words containing the physical addresses. On loading a general purpose register with a data word comprising an address as signalled by the tag, reference is had to the segment base table to load the corresponding back-up register with the pointer. On storing in a segment a data word comprising an address as similarly determined, reference is had to the segment base table to store the data word containing the pointer.

2 Claims, 4 Drawing Figures

ELECTRONIC COMPUTER COMPRISING A PLURALITY OF GENERAL PURPOSE REGISTERS AND HAVING A DYNAMIC RELOCATION CAPABILITY

BACKGROUND OF THE INVENTION

This invention relates to an electronic digital computer comprising a plurality of general purpose registers and having a dynamic relocation capability.

A recent electronic computer system of relatively large scale is usually capable of carrying out multiprogramming, namely, capable of concurrently carrying out a plurality of user's programs. A typical example is a time-sharing system that enables a multiplicity of users to utilize concurrently various resources of the computer system in a time-shared fashion. For the multiprogramming system, it is essential to raise the working efficiency of the available computer resources, above all the service efficiency of the main memory.

Dynamic relocation is often resorted to in time-sharing and the like systems to raise the service efficiency of the main memory. This makes it possible to load the main memory with a program from secondary storage, such as drum or disc, at a selected main memory area.

One of the systems for dynamic relocation is the so-called "paging" system utilizing a mapping mechanism for dynamically converting each logical address (page number and line number) to a physical address. Logical addresses contained in the program are converted to physical addresses by employing the mapping mechanism. Another system is the relocation register system utilizing a particular register, called the relocation register, which is loaded with the base address for the program. The addresses given in the program are the relative addresses from the base address and are converted to the physical addresses by addition thereof to the base address.

In either case, the addresses contained in the program are not the physical addresses of the main memory but what should be converted to the physical addresses either by way of mapping or addition. It is therefore unnecessary on transferring a program from secondary storage to the main memory to modify the program, simply requires changing the mapping mechanism or the content of the relocation register relating to the program. With these kinds of hardware, it becomes easy to store the desired program in the main memory at any area capable of storing the program, to thereby raise the efficiency of the main memory.

The paging system has two additional advantages. One is to enable the blank pages scattered in the main memory to be used as a logically contiguous address space. The other is to enable the main memory to be used as a virtual memory of a larger memory area for the users, by storing in the main memory only the pages presently needed to carry out the program. The paging system, however, has two serious disadvantages. One is the increased cost, arising from the complicated mapping mechanism. The other is degradation of performance arising from the fact that the mapping mechanism must be referred to each time an access to the main memory is desired.

The relocation register system is advantageous with respect to the smaller increase in the cost of hardware, and regarding the relatively little adverse effect on performance. It is mandatory in the relocation register system, however, that a program be stored in the main memory at a continuous area, even if the program may consist of a plurality of logically discontinuous blocks. This inevitability makes it difficult, when two or more programs have a common program portion, such as a subroutine, to store in the main memory only one copy of that program portion for repeated use in carrying out the programs. In other words, it is necessary to store copies of the program portion in the main memory, one copy for each program. Furthermore, it is impossible to use the main memory as a virtual memory.

A computer system, such as System 360 of IBM, Model 50, having a plurality of general purpose registers and enabling each general purpose register to be used as a relocation register is equivalent to a system provided with a plurality of relocation registers. With a computer system of this type, it may appear that the last-mentioned difficulty is avoided by assigning one of the general purpose registers as the relocation register for the common program portion. The general purpose register, however, is not only used as the relocation register but also as a temporary store for data and as an index register. Consequently, the content of a general purpose register may either be rewritten or transferred to another general purpose register or to the user's area if the user wishes to do so. In other words, it is impossible to prohibit the users from rewriting the contests of the general purpose register and storing the content in the user's area. This means that the system program (the monitor supervisor) can no longer supervise those general purpose registers which are used as relocation registers. Further, the requirements for the supervisor not only to rewrite the contents of the relocation registers but also to find out the general purpose registers used as the relocation registers and the user's areas containing the copies of the relocation registers, make it impossible in practice to effect dynamic relocation.

SUMMARY OF THE INVENTION

It is therefore an object of this invention to provide an electronic digital computer having a plurality of general purpose registers whereby dynamic relocation may be easily effected.

It is another object to provide an electronic computer of the type permitting dynamic relocation for a segment, or an identifiable set of procedures or data, of an optional dimension.

It is still another object to provide a computer of the type whereby it is possible for a user to use an apparently wider area than the actual main memory space.

In accordance with this invention, the user's programs and the data processed in accordance therewith are divided into a plurality of segments on the basis of logical identification. The allocation for the main memory is based on such segments. A segment may be a subroutine, an array of data, a set of data, or a combination of thereof. Each segment is given a segment number specific thereto. Any data or instruction of a program is identified by the segment number of the segment to which it belongs and a relative address within the segment. This pair of a segment number and a relative address is referred to as a logical address. On referring to one of the data or insructions, use is made of the memory address that shows the location of the data or instruction referred to. This address is called a physical address, which corresponds to the logical address. At least one segment base table is provided in the main memory or the register memory, in which the supervisor registers the physical base addresses (the segment bases) of the respective segments in the memory. It should be noted that the segment base table provides a reference, similar to the mapping mechanism, for converting between the logical addresses and the physical addresses for each segment.

Access from the user's program to a datum or a procedure in a segment is achieved, as in System 360, Model 50 or a like computer having a plurality of general purpose registers usable as relocation registers, by means of the displacement and the base addresses with which a general purpose register is loaded with reference to the segment base table. It should be noticed, however, as to the computer according to this invention that the addresses for data or instructions are specified in the user's programs neither as physical addresses per se, nor, as is the case with relocation register system, as relative addresses from a fixed base address but as logical addresses. This type of addressing is referred to as two-dimensional addressing. Each data word is provided with a tag of at least one bit for distinguishing address data representing data locations from data other than address data. Likewise, each general purpose register is provided with at least one bit for tag which shows whether the general purpose register is loaded with a physical address or the other datum.

The computer is provided with back-up registers in one-to-one correspondence with the general purpose registers. The back-up register corresponding to a general purpose register loaded with a data word containing a physical address is loaded with the corresponding logical address. When it is desired to store in the main memory the data word with which a general purpose register is loaded, the tag of the data word is tested. If the data word is found to contain an address datum, the logical address with which the corresponding back-up register is loaded is stored in the main memory. Otherwise, the data word with which the general purpose register is loaded is stored in the main memory. When it is desired to load a general purpose register with a data word stored in the main memory, the tag is checked. If the data word is determined to contain an address datum, the physical base address for the segment is first obtained by referring to the segment base table by the segment number given in the address datum (the logical address). Subsequently, the physical address corresponding to the address datum is derived by way of adding the displacement contained in the address datum to the base address. The general purpose register is now loaded with the resulting physical address together with the tag for specifying that the data word has an address datum which is a physical address in this case. In the meantime, the corresponding back-up register is loaded with that address datum stored in the main memory, which is a logical address. When it is desired to modify that address datum by a certain amount with which a general purpose register is loaded, the displacement in the logical address with which the corresponding back-up register is loaded is subjected to a variation of the same amount to warrant the correspondence between the contents of the general purpose and the back-up registers. A logical address serves as a pointer to the corresponding physical address.

According to this invention as described above, all address data is stored in the form of logical addresses in the main memory and in secondary storage except in the segment base table. This makes it possible to carry out dynamic relocation by merely rewriting of the segment base table.

According to this invention, all the data words stored in the segment base table contain physical addresses. It is therefore possible to use the tag to indicate whether the physical address is an address in the main memory or in the secondary storage. When it is found with reference to the segment base table that the base address does not exist in the main memory, the program is trapped. The supervisor acknowledges the fact, relocates the segment having the base address into the main memory at a new base address, and rewrites the segment base table for the segment. This enables the segments to be stored in the secondary storage before the actual use thereof, to make the users use a virtual memory having a wider logical address space than the actual main memory.

DESCRIPTION OF THE PREFERRED EMBODIMENTS

Figures 1, 2, 3:
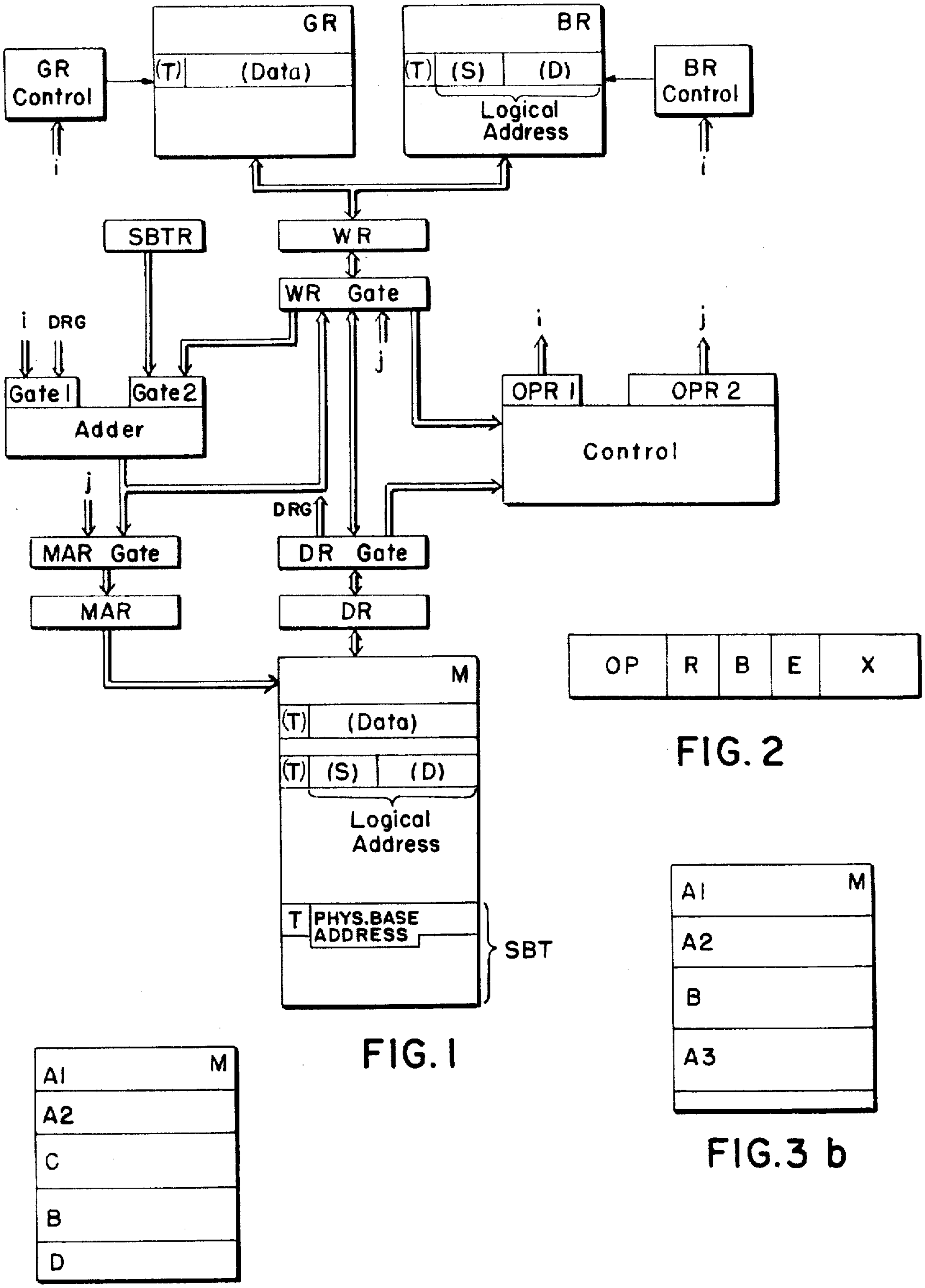
FIG. 1 is a block diagram of an electronic computer according to this invention.
FIG. 2 shows a format of the instructions.
FIG. 3(*a*) and 3(*b*) illustrate the main memory before and after the dynamic relocation respectively.

Referring to FIG. 1, an electronic computer to which this invention is applicable comprises a main memory M for storing various data words dealt with by the computer and various instructions for the computer, and a first and a second operand register OPR 1 and 2 which are loaded with various first and second operands $i$ and $j$, respectively, one each at a time. A main control CONTROL controls the read out of the desired instruction from the main memory M, decodes the read-out instruction, sets the first and the second operands $i$ and $j$ in the first and the second operand registers OPR 1 and 2, respectively, and supplies the control signals (the commands) to various gate and control circuits illustrated later and to the main memory M. The computer further comprises a memory address register MAR for specifying the desired address in the main memory M, a memory address register gate circuit MAR GATE responsive to the command therefor and either to the second operand $j$ or to the output of an adder ADDER described later for loading the memory address register MAR with the desired address, a data register DR serving as the input/output register for the main memory M, and a data register gate circuit DR GATE responsive to the command therefor for loading the data register DR with the data word or the instruction supplied thereto and unloading the data word or the instruction therefrom. The unloading and the loading may be the writing in of a data word to an instruction to the main memory M at the address specified by the memory address register MAR and reading out of the data word or the instruction stored therein at such address. The unloading may also be to supply the instruction to the main control CONTROL and to supply the data word to the adder ADDER through the lead having the legend DRG.

The computer still further comprises a plurality of general purpose registers GR's, a general purpose register control circuit GR CONTROL for activating the general purpose register $GR_i$ ($i = 0, 1 ...$) specified by a first operand $i$ supplied thereto from the first operand register OPR 1, a work register WR serving as the input/output register for the general purpose registers GR's, and a work register gate circuit WR gate responsive to the command therefor for loading the work register WR with the data word supplied thereto and for unloading the data word therefrom. The unloading and the loading relative to the work register WR may be the writing in and the reading out of the general purpose register $GR_i$ specified by the first operand $i$, respectively, The unloading and the loading may also be for the data word sent to and sent from, respectively, the data register DR through the work and the data register gate circuits WR and DR GATE. Furthermore, the unloading and the loading may be for the data word sent to the main control CONTROL and for the second operand $j$ sent from the second operand register OPR 2, respectively.

The computer yet further comprises an adder first gate circuit GATE 1 supplied with the first operand $i$ from the first operand register OPR 1 or the output signal DRG of the data register gate circuit DR GATE, an adder second gate circuit GATE 2 supplied with the output of the work register gate circuit WR GATE, and the already-mentioned adder ADDER responsive to the command therefor for arithmetically processing the information supplied thereto through the adder first and second gate circuits GATE 1 and 2 and for supplying the result of the arithmetic operation to the memory address and the work register gate circuits MAR and WR GATE's. The data register gate circuit DR GATE can unload the desired subfield of the data register DR. The work register gate circuit WR GATE can load the work register WR with the information at the desired subfield and unload the optional subfield therefrom.

According to this invention, the computer comprises at least one segment base table SBT in the main memory M and a tag field (T), for carrying a tag T of at least one bit in each of the general purpose registers GR's and the addresses in the main memory M and the secondary storage (not shown), the segment base table SBT inclusive. A register memory (not shown) may be provided for the segment base table SBT.

The main memory M and the secondary storage are divided into a plurality of segments with reference to the programs. The segments are given the respective segment numbers S. The location of each segment in the main memory M and in secondary storage is given by the physical base address (the segment base). The base addresses are stored in the segment base table SBT together with the tags T, so that the base addresses may be obtained in compliance with the respective segment numbers S. The tag in each of the general purpose registers GR's and the addresses in the main memory M and the secondary storage except the segment base table area is logical 1 and 0 when the data word contains an address datum or does not, respectively. The tag T in each address in the segment base table SBT is logical 1 and 0 when the base address is the address in the secondary storage and in the main memory M, respectively.

The computer further comprises a plurality of back-up registers BR's, equal in number to the general purpose registers GR's, and a back-up register control circuit BR CONTROL, responsive to the same first operand $i$ as that by which the general purpose register $GR_i$ is activated, for selectively activating that back-up register $BR_i$ which corresponds to the selected general purpose register $GR_i$. Each back-up register BR is preferably provided with a tag field (T) similar to that in the general purpose register GR. The work register WR serves also as the input/output register for the back-up registers BR's. The main control CONTROL comprises means for determining the tag T. The computer still further comprises a table base register SBTR loaded with the physical base address for the segment base table SBT and coupled with the adder second gate circuit GATE 2. Each of the back-up registers BR's and the addrsses in the main memory M and the secondary storage except the segment base table SBT comprises a segment field (S) for a segment number S and a displacement field (D) for a displacement D.

Referring to FIG. 2, an instruction is composed of an operation field OP for specifying the operation, a first operand field R specifying a general purpose register $GR_i$ as a first operand $i$ a base register field B for specifying a general purpose register $GR_B$ to be used as a base register, an index register field I for specifying a general purpose register $GR_I$ to be used as an index register, and a displacement field X for giving the displacement D. The information represented by $GR_B + GR_I + D$ is used as an effective second operand $j$.

EXECUTION OF INSTRUCTIONS

For the clarity of description, execution of instructions will be explained hereunder only in conjunction with the instructions particular to the computer according to this invention. Such instructions are:

load instructions L's,
store instructions ST's,
add instructions ADD's,
subtract instructions SUB's,
load segment base table instructions LSBT's
store segment base table instructions STSBT's,
load special instructions LS's, and
store special instructions STS's.

If the data word of the main memory M or of the general purpose register GR has a logical O tag T, the data word contains a datum other than the address data. In this case, the instructions are executed in the conventional manner. If the data word has a logical 1 tag T, the data word contains an address datum. In this latter case, the instructions are carrid out in a different manner as described in the following.

If the data word of the segment base table SBT has a logical 1 tag T, the physical base address contained in the data word is not the address in the main memory M but in the secondary storage. In this case, the program is trapped. Subsequently, the supervisor achieves allotment of a memory area in the main memroy M for the segment. If the data word of the segment base table SBT has a logical 0 tag T, the physical base address is the address in the main memory M. In this latter case, the instructions are carried out in the manner described hereunder.

A LOAD INSTRUCTION L

If the data word stored in the main memory M at the address specified by the second operand $j$ in the instruction has a logical 1 tag T, the data word contains a logical address, namely, a segment number S and a displacement D (The displacement may be zero). In this case, the back-up register $BR_i$ corresponding to the general purpose register $GR_i$ specified by the first operand $i$ is loaded with the logical address. Furthermore, the tag T of the data word stored in th segment base table SBT at the address defined by the segment number S is tested. If the latter data word containing the physical base address has a logical 1 tag T, the physical base address is an address in the secondary storage. The program is therefore trapped. If the latter data word has a logical 0 tag T, the specified general purpose register $GR_i$ is loaded with the sum obtained by adding the displacement D contained in the first-mentioned data word to the physical base address, with the tag T of the specified general purpose register $Gr_i$ turned to logical 1. Thus, the specified general purpose register $Gr_i$ is loaded with the physical address corresponding to the logical address with which the corresponding back-up register $BR_i$ is loaded.

If the first-mentioned data word has a loical 0 tag T, the specified general purpose register $GR_i$ is loaded with the data word in the conventional manner. The corresponding back-up register register $BR_i$ remains untouched.

The series of the commands for a load instruction L is as follows:

Step 1. MAR $= j$ : That gate in the memory address register gate circuit MAR GATE which is interposed between the memory address register MAR and the second operand register OPR 2 is opened to allow transfer of the second operand $j$ to the memory address register MAR.

Step 2. DR $= M_{MAR}$ : The data word stored in the main memory M at the address $j$ with which the memory address register MAR is loaded is read out to the data register DR. The data word contains the logical address if the tag T is logical 1.

Step 3. IF DR(T) = 1 THEN DO : If the tag T of the data register DR is determined by the main control CONTROL to be logical 1, the following commands are carried out.

Step 4. WR = DR : The content of the data register DR is transferred to the work register WR through the data and the work register gate circuits DR and WR GATE.

Step 5. $BR_i$ = WR : The content of the work register WR is written in the back-up register $BR_i$ activated by the back-up register control circuit BR CONTROL in compliance with the first operand $i$.

Step 6. MAR = SBTR + DR(S) : The segment field (S) extracted from the data register DR through the data register gate circuit DR GATE and supplied to the adder ADDER through the adder first gate circuit GATE 1 is added to the table base address supplied also to the adder ADDER from the table base register SBTR through the adder second gate circuit GATE 2. The resultant sum gives the address of the physical base address stored in the segment base table SBT for the segment number S. The result of addition is transferred to the memory address register MAR.

Step 7. DR $= M_{MAR}$ : The data word stored in the main memory M (the segment base table area) at the address given by the memory address register MAR is read out to the data register DR. If the data word is provided with a logical 1 tag T, the physical base address contained in the data word does not exist in the main memory M but in the secondary storage.

Step 8. IF DR(T) = 1 THEN GO TO TRAP : If the tag T of the data register DR is logical 1, the program is trapped.

Step 9. ELSE DO: If the tag T is not logical 1, the following commands are carried out.

Step 10. WR(DATA) = WR(D) + DR(DATA) : The data field (DATA) extracted from the data register DR through the data register gate circuit DR GATE and supplied to the adder ADDER through the adder first gate circuit GATE 1 is added to the displacement D extracted from the work register WR through the work register gate circuit WR GATE and supplied to the adder ADDER through the adder second gate circuit GATE 2. The resultant sum gives the physical address of the datum. The result of addition is written in the data field (DATA) of the work register WR.

Step 11. WR(T) = 1 : The tag T of the work register WR is set at logical 1.

Step 12. $GR_i$ = WR : The content of the work register WR is written in the general purpose register $GR_i$ activated by the general purpose register control circuit GR CONTROL in compliance with the first operand $i$.

Step 13. END : The end of the command trains carried out under the conditions given by Steps 3 and 8.

Step 14. ELSE DO : If the tag T is not logical 1 in the Step 3, the following conventional series of commands is carried out.

Step 15. WR = DR : Same as Step 4.

Step 16. $GR_i$ = WR : Same as Step 12.

Step 17. END : The end of the conventional command train.

A STORE INSTRUCTION ST.

If the general purpose register $GR_i$ specified by the first operand $i$ is loaded with a data word containing the physical address of a datum, the logical address with which the corresponding back-up register $BR_i$ is loaded is stored in the main memory M at the address given by the second operand $j$. If the specified general purpose register $GR_i$ is loaded with a data word containing a datum other than the address data, the data word is stored in the main memory M in the conventional manner. In this latter case, the corresponding back-up register $BR_i$ remains untouched.

The series of the commands for a store instruction ST is as follows:

Step 1. WR = $GR_i$ : The general purpose register $GR_i$ specified by the first operand $i$ is read out to the work register WR.

Step 2. IF WR(T) = 1 THEN DO : If the tag T of the work register WR is logical 1, namely, if the specified general purpose register $GR_i$ is loaded with a data word containing a physical address, the following commands are carried out.

Step 3. WR = $BR_i$ : The data word containing the logical address with which the corresponding back-up register $BR_i$ is loaded, is read out to the work register WR.

Step 4. DR = WR : The work register WR is transferred to the data register DR.

Step 5. MAR $= j$ : The second operand $j$ is transferred to the memory address register MAR.

Step 6. $M_{MAR}$ = DR : The data register DR is stored in the main memory M at the address specified by the memory address register MAR.

Step 7. END : The end of execution of the store instruction ST when the specified general purpose register $GR_i$ is loaded with a data word containing a physical address.

Step 8. ELSE DO : If the specified general purpose register $GR_i$ is loaded with a data word containing a datum other than the address data, the following conventional series of commands is carried out.

Step 9. DR = WR : Same as Step 4.

Step 10. MAR = $j$ : Same as Step 5.

Step 11. $M_{MAR}$ = DR : Same as Step 6.

Step 12. END : The end of execution of the store instruction ST when the specified general purpose register $GR_i$ is loaded with a data word containing a datum other than the address data.

AN ADD OR A SUBTRACT INSTRUCTION ADD OR SUB.

If the general purpose register $GR_i$ specified by the first operand $i$ is loaded with a data word containing a physical address, the datum stored in the main memory M at the address given by the second operand $j$ is added to or subtracted from the physical address with which the specified general purpose register $GR_i$ is loaded. The result of the arithmetic operation is substituted for the previous physical address with which the specified general purpose register $GR_i$ was loaded.

If the specified general purpose register $GR_i$ is loaded with a data word containing a datum other than the address data, the specified general purpose register $GR_i$ is loaded in the conventional manner with the result of the addition or subtraction. The corresponding back-up register $BR_i$ remains untouched.

The series of the commands for an add or a subtract instruction ADD or SUB is as follows:

Step 1. WR = $GR_i$ : The general purpose register $GR_i$ specified by the first operand $i$ is read out to the work register WR.

Step 2. MAR = $j$ : The second operand $j$ is transferred to the memory address register MAR.

Step 3. DR = $M_{MAR}$ : The data word stored in the main memory M at the address $j$ specified by the memory address register MAR is read out to the data register DR.

Step 4. WR(DATA) = WR(DATA) ± DR(DATA) : The data fields (DATA)'s of the work register WR and the data register DR are added together or the latter is subtracted from the former, in the adder ADDER. The result is written in the data field (DATA) of the work register WR.

Step 5. $GR_i$ = WR : The work register WR is written in the specified general purpose register $GR_i$.

Step 6. IF WR(T) = 1 THEN DO : If the tag T of the work register WR is logical 1, namely, if the specified general purpose register $GR_i$ was originally loaded with a data word containing a physical address, the following comamnds are carried out.

Step 7. WR = $BR_i$ : The back-up register $BR_i$ corresponding to the specified general purpose register $GR_i$ is read out to the work register WR.

Step 8. WR(D) = WR(D) ± DR(DATA) : The displacemet field (D) of the work register WR and the data field (DATA) of the data register DR are added together or the latter is subtracted from the former, in the adder ADDER. The result is written in the displacement field (D) of the work register WR.

Step 9. $BR_i$ = WR : The work register WR is written in the corresponding back-up register $BR_i$.

Step 10. END : The end of execution of the add or the subtract instruction ADD or SUB when the specified general purpose register $GR_i$ was originally loaded with a data word containing a physical address.

Step 11. ELSE END : If the specified general purpose register $GR_i$ was originally loaded with a data word containing a datum other than the address data, a conventional add or subtract instruction has already been executed to the end at Step 5.

A LOAD SEGMENT BASE TABLE INSTRUCTION LSBT.

If that data word containing the physical base address which is stored in the segment base table SBT for the segment number S given by the second operand $j$ has a logical 0 tag T, the physical base address is an address in the main memory M. In this case, the general purpose register $GR_i$ specified by the first operand $i$ is loaded with the physical base address, with the tag T of the specified general purpose register $GR_i$ turned to logical 1. Furthermore, the corresponding back-up register $BR_i$ is loaded with a logical 1 at the tag field (T), the second operand $j$ at the segment field (S), and logical 0's at the displacement field (D). Thus, the data word with which the corresponding back-up register $BR_i$ is loaded contains the logical address corresponding to the physical base address.

If the data word stored in the segment base table SBT has a logical 0 tag T, the physical base address is in the secondary storage. In this latter case, the program is trapped.

The series of the commands for a load segment base table instruction LSBT is as follows:

Step 1. WR(S) = $j$ : The second operand $j$ is written in the segment field (S) of the work register WR.

Step 2. WR(T) = 1 : The tag T of the work register WR is set at logical 1.

Step 3. WR(D) = 0 : The data field (D) of the work register WR is set at all logical 0's.

Step 4. $BR_i$ = WR : The work register WR is written in the back-up register $BR_i$ specified by the first operand $i$.

Step 5. MAR = SBTR ± $j$ : The memory address register is loaded with the sum of the table base register SBTR and the second operand $j$. The sum gives the physical address of the physical base address to be sought in the segment base table SBT.

Step 6. DR = $M_{MAR}$ : The data word stored in the main memory M at the address specified by the memory address register MAR is read out to the data register DR. The data word contains the physical base address.

Step 7. IF DR(T) = 1 THEN GO TO TRAP : If the tag T of the data register DR is logical 1, namely, if the physical base address is an address in the secondary storage, the program is trapped.

Step 8. ELSE DO : If the data word stored in the specified address has not a logical 1 tag T, namely, if the physical base address is an address in the main memory M, the following commands are carried out.

Step 9. WR = DR : The data register DR is transferred to the work register WR.

Step 10. WR(T) = 1 : The tag T of the work register WR is set at logical 1.

Step 11. $GR_i$ = WR : The work register WR is written in the general purpose register $GR_i$ specified by the first operand $i$.

Step 12. END: The end of execution of the load segment base table instruction LSBT when the physical base address is an address in the main memory M.

A STORE SEGMENT BASE TABLE INSTRUCTION STSBT.

The general purpose register $GR_i$ specified by the first operand $i$ is stored in the segment base table SBT at the address defined by the second operand $j$, irrespective of the kind of the data word with which the specified general purpose register $GR_i$ is loaded.

The series of commands for a store segment base table instruction is as follows:

Step 1. $WR = GR_i$ : The general purpose register $GR_i$ specified by the first operand $i$ is read out to the work register WR.

Step 2. DR = WR : The work register WR is transferred to the data register DR.

Step 3. $MAR = SBTR \pm j$ : The memory address register MAR is loaded with the sum of the table base register SBTR and the second operand $j$. The address specified by the memory address register MAR is the address defined by the second operand $j$.

Step 4. $M_{MAR} = DR$ : The data register DR is stored in the main memory M at the address specified by the memory address register MAR.

A LOAD SPECIAL INSTRUCTION LS.

The general purpose register $GR_i$ specified by the first operand $i$ is loaded with the data word stored in the main memory M at the address given by the second operand $j$, irrespective of the tag T.

The series of commands for a load special instruction LS is as follows:

Step 1. $Mar = j$ : The second operand $j$ is transferred to the memory address register MAR.

Step 2. $DR = M_{MAR}$ : The data word stored in the main memory M at the given address $j$ is read out to the data register DR.

Step 3. WR = DR : The data reigster DR is transferred to the work register WR.

Step 4. $GR_i = WR$ : The work register WR is written in the general purpose register $GR_i$ specified by the first operand $i$.

A STORE SPECIAL INSTRUCTION STS.

The general purpose register $GR_i$ specified by the first operand $i$ is stored in the main memory M at the address given by the second operand $j$, without regard to the tag T.

The series of commands for a store special instruction STS is as follows:

Step 1. $WR = GR_i$ : The general purpose register $GR_i$ specified by the first operand $i$ is read out to the work register WR. Step 2. DR = WR : The work register WR is transferred to the data register DR.

Step 3. $MAR = j$ : The second operand $j$ is transferred to the memory address register MAR.

Step 4. $M_{MAR} = DR$ : The data register DR is stored in the main memory M at the address given by the second operand $j$.

EXECUTION OF A PROGRAM

It is now assumed that the contents of the segment base table SBT and the main memory M before start of the program are as follows:

The segment base table SBT:

| Segment Number S (Displacement D from the Table Base Register SBTR) | Tag T | Base Address (Physical) |
|---|---|---|
| 0 | 0 | 100 |
| 1 | 0 | 5500 |
| 2 | 1 | 156300 |

The main memory M:

| Address | Tag T | Datum. Alternatively, Segment Number S and Displacement D |
|---|---|---|
| 100 | 0 | 50 |
| 101 | 0 | 100 |
| 252 | 0 | 0 |

A user's program is assumed to consist of the following instructions:

Step 1. LSBT/ R1, 0 : The physical base address "100" stored in the segment base table SBT for the segment number "0" is written in the general purpose register $GR_1$ specified by the first operand "1," with the tag T of the specified general purpose register $GR_1$ turned to logical 1. The corresponding back-up register $BR_1$ is loaded with "1" at the tag field (T), the segment number "0" in the segment field (S), and the displacement "0" at the desplacement field (D). The results are:

$$GR_1: (T) = 1, (DATA) = 100$$

and $$BR_1: (T) = 1, (S) = 0, (D) = 0.$$

Step 2. L1 R2, R1(0) : The general purpose register $GR_2$ specified by the first operand "2" is loaded with the data word "50" with the "0" tag T stored in the main memory M at the address given by the sum "100" of the content "100" of the general purpose register $GR_1$ specified by "1" in the base register field B plus "0" given in the displacement field X. The result is:

$$GR_2: (T) = 0, (DATA) = 50.$$

Step 3. ADD/ R2, R1(1) : The general purpose register $GR_2$ specified by the first operand "2" is loaded with the sum "150" of the original content "50" thereof and the datum "100" with the "0" tag T stored in the main memory M at the address given by the sum "101" of the content "100" of the general purpose register $GR_1$ specified by "1" in the base register field B plus "1" given in the displacement field X. The result is:

$$GR_2: (T) = 0, (DATA) = 150.$$

Step 4. ST/ R2, R1(1) : The content "150" of the general purpose register $GR_2$ specified by the first operand "2" is stored in the main memory M at the address given by the same sum "101" as that mentioned in Step 3. The result is:

$$M \text{ (Address 101)}: (T) = 0, (DATA) = 150.$$

Step 5. ADD/ R1, R1(1) : The general purpose register $GR_1$ specified by the first operand "1" is loaded with the sum "250" of the original content "100" thereof and the datum "150" stored by Step 4 in the main memory M at the address given in turn by the same sum "101" as that mentioned in Step 3. Inasmuch as the tag T of the specified general purpose register $GR_1$ is "1," the corresponding back-up register $BR_1$ is loaded at the displacement field (D) with the sum "150" of the original content "0" thereof and the datum "150." The results are:

$$GR_1: (T) = 1, (DATA) = 250$$

and $BR_1$: (T) = 1, (S) = 0, (D) = 150.

Step 6. ST/ R1, R1(2) : Inasmuch as the tag T of the general purpose register $GR_1$ specified by the first operand "1" is "1," the present content of the corresponding back-up register $BR_1$ is stored in the main memory at the address given by the sum "252" of the content "250" of the general purpose register $GR_1$ specified by "1" in the base register field B plug the displacement "2." The result is:

M (Address 252): (T) = 1, (S) = 0, (D) = 150.

Step 7. L/ R3, R1(2) : Inasmuch as the tag T of the data word stored in the main memory M at the address given by the same sum "252" at that mentioned in Step 6 is "1," test is applied to the data word stored in the segment base table SBT at the segment number "0" given in turn by "0 " in the segment field (S) of the data word stored in the main memory M. Inasmuch as the tag T of the data word stored in the segment base table SBT is "0," the general purpose register $GR_3$ specified by the first operand "3" is loaded with that physical address "250," with the tag T turned to "1," which is obtained as the sum of the physical base address "100" given in the segment base table SBT plus the displacement "150" given in the main memory M. Furthermore, the corresponding back-up register $BR_3$ is loaded with the data word given in the main memory M. The results are:

$GR_3$: (T) = 1, (DATA) = 250 and $BR_3$: (T) = 1, (S) = 0, (D) = 150.

Step 8. LSBT/ R4, 2 : The general purpose register $GR_4$ specified by the first operand "4" is to be loaded with the physical address "156300" of the segment whose segment number S is "2." Inasmuch as the tag T for this base address in "1," the program is trapped.

It is now understood that the load instructions L's (Steps 2 and 7), the store instructions ST's (Steps 4 and 6), and the add instructions ADD's (Steps 3 and 5) are executed dependent on whether each datum to be dealt with is an address datum or not. This makes it sufficient that physical addresses appear only in the segment base table SBT and in the general purpose registers GR's, to simplify the process of the dynamic relocation.

DYNAMIC RELOCATION

Referring to FIGS. 3 *a* and *b*, it is now assumed that a process $P_A$ requires three segments A1, A2, and A3 and that memory areas in the main memory M are already allotted to the segments A1 and A2 but not yet to the segment A3 as shown in FIG. 3 *a*. As exemplified in the next preceding section "Execution of a Program," the segment base table SBT contains the base addresses for the segments A1, A2, and A3, respectively, with a tag of logical 0 for each of the segments A1 and A2 and with a tag of logical 1 for the segment A3. The main memory M also contains segments B, C, and D for other processes being processed in the time-shared fashion.

When the segment A3 becomes necessary, the process $P_A$ causes a load segment base table instruction LSBT specifying the segment number for the segment A3 by the displacement field X to be executed. During the execution, the process $P_A$ is trapped in the manner already explained. The supervisor responds to the trap, notes that a memory area should be allotted to the segment A3, and starts the dynamic relocation. Segments in the main memory M are successively checked if they are actually in use or not. The areas of the segments not in use are seccessively compared with the area of the segment A3. It may be assumed that the segments C and D are not in use and that each is narrower than the segment A3. The sum of the areas of the segments B and C is compared with the area of the segment A3 and found wider than the latter area. As illustrated in FIG. 3 b, the segment B is transferred to follow the segment A2 in order to provide a continuous area for the segment A3. The physical base address for the segment B is rewritten in the segment base table SBT. The segment A3 is transferred from the secondary storage to the continuous area. The tag and the physical base address for the segment A3 are rewritten in the segment base table SBT. The supervisor restarts the process $P_A$ at the load segment base table instruction LSBT.

The above-described arrangement is merely illustrative of the present invention. Numerous modifications and adaptations thereof will be readily apparent to those skilled in the art without departing from the principles of the present invention.

What is claimed is:

1. An electronic computer employing dynamic storage relocation, comprising a plural location memory portion including a segment storage position table stored therein, said segment table memory portion storing the physical base storage addresses of plural stored program segments, said computer also including means for storing data in said memory portion and means for storing program instruction addresses in logical address form comprising an address in said segment base table and a displacement factor relative to the stored base address, said stored data and addresses including a field for characterizing the respective memory locations as containing an address or an item other than an adress, said computer further including plural general purpose registers and plural back-up registers in one-to-one correspondence with said general purpose registers, means for reading the stored contents of a location in said memory, means responsive to said data-address characterizing field of words read from said memory portion for identifying address words, means for entering each said identified address word from said memory portion into a selected one of said back-up registers in logical address form and including means for entering said address word into the associated one of said general purpose registers in derived physical address form, and means for storing logical addresses in said memory from said back-up registers.

2. A combination as in claim 1, further comprising means for relocating a stored program segment, said relocating means also including means for updating the contents of the corresponding segment table memory location to contain a new base physical address for the relocated program segment.

* * * * *